(12) United States Patent
Lopez et al.

(10) Patent No.: US 9,847,954 B2
(45) Date of Patent: Dec. 19, 2017

(54) DISTRIBUTED METHOD OF DATA ACQUISITION IN AN AFDX NETWORK

(71) Applicant: Airbus Operations (S.A.S.), Toulouse (FR)

(72) Inventors: Juan Lopez, Grenade (FR); Emilie Claudel, Tournefeuille (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 669 days.

(21) Appl. No.: 14/255,582

(22) Filed: Apr. 17, 2014

(65) Prior Publication Data

US 2014/0313943 A1 Oct. 23, 2014

(30) Foreign Application Priority Data

Apr. 19, 2013 (FR) ...................................... 13 53573

(51) Int. Cl.
  *H04L 12/931* (2013.01)
  *H04L 12/40* (2006.01)
  *H04L 12/46* (2006.01)
  *H04L 5/14* (2006.01)
  *H04L 12/713* (2013.01)
  (Continued)

(52) U.S. Cl.
  CPC ................ *H04L 49/70* (2013.01); *H04L 5/14* (2013.01); *H04L 12/40* (2013.01); *H04L 12/4625* (2013.01); *H04L 12/4641* (2013.01); *H04L 45/586* (2013.01); *H04L 45/72* (2013.01); *H04L 49/10* (2013.01); *H04L 2012/4028* (2013.01)

(58) Field of Classification Search
  None
  See application file for complete search history.

(56) References Cited

U.S. PATENT DOCUMENTS

| 7,352,744 B2 | 4/2008 | Saint Etienne et al. |
| 2008/0043768 A1* | 2/2008 | Lopez ................. H04L 12/5693 370/412 |

(Continued)

FOREIGN PATENT DOCUMENTS

| EP | 2 249 520 | 11/2010 |
| FR | 2 832 011 | 5/2003 |

OTHER PUBLICATIONS

Preliminary Search Report for French Application 1353573 dated Jan. 14, 2014.

(Continued)

*Primary Examiner* — Derrick Ferris
*Assistant Examiner* — Manuel Rangel
(74) *Attorney, Agent, or Firm* — Jenkins, Wilson, Taylor & Hunt, P.A.

(57) ABSTRACT

The subject matter disclosed herein relates to a frame switch of an AFDX network in which the data acquisition application is decentralized. When the switch has to acquire the data transmitted on a virtual link, the switching table contains, apart from the input port and the output port (s) taken by this link, an ID representing the MAC address of the switch. The frames of this link are then not only switched but also transmitted to the network interface of the switch and processed by a dedicated application (DDA), hosted inside the switch. This application can be interrogated by a remote server and transfer the data that it has stored locally.

13 Claims, 5 Drawing Sheets

(51) Int. Cl.
*H04L 12/721* (2013.01)
*H04L 12/933* (2013.01)

(56) References Cited

U.S. PATENT DOCUMENTS

| | | | | |
|---|---|---|---|---|
| 2008/0165705 A1* | 7/2008 | Umayabashi | ............ | H04L 45/48 370/256 |
| 2010/0014535 A1* | 1/2010 | Sherman | .............. | H04L 12/5693 370/409 |
| 2011/0103268 A1* | 5/2011 | Mann | ................ | H04L 12/40169 370/276 |
| 2011/0228767 A1* | 9/2011 | Singla | ..................... | H04L 49/00 370/389 |
| 2012/0150827 A1* | 6/2012 | Ishii | .................. | G06F 17/30156 707/692 |
| 2012/0203401 A1* | 8/2012 | Dunsdon | ............ | H04B 7/18506 701/3 |
| 2013/0208630 A1* | 8/2013 | Bobrek | ................... | H04L 67/12 370/276 |
| 2013/0268631 A1* | 10/2013 | Suh | ...................... | H04N 21/235 709/219 |
| 2014/0003434 A1* | 1/2014 | Assarpour | ............. | H04L 43/026 370/392 |

OTHER PUBLICATIONS

AFDX/ARINC 664 Protocol Tutorial dated 2010 from URL: http://www.geautomation.com/download/afdxarinc-664-protocol-tutorial.

Ian Land and Jeff Elliott: "Architecting ARINC 664, Part 7 (AFDX) Solutions", Application Note: VIRTEX-4 and VIRTEX-5 FPGAS, No. version 1.0.1 dated May 22, 2009, pp. 1-25, XP007918728, from URL: http://www.xilinx.com/support/documentation/application_notes/xapp1130.pdf.

* cited by examiner

| No. VL_id | Input port | Output port(s) | Data acquisition |
|---|---|---|---|
| $VL_1^{na}\_Id$ | $P^{in}(VL_1^{na})$ | $P^{out}(VL_1^{na})$ | — |
| ------ | ------ | ------ | ------ |
| $VL_P^{na}\_Id$ | $P^{in}(VL_P^{na})$ | — | — |
| $VL_1^{a}\_Id$ | $P^{in}(VL_1^{a})$ | $P^{out}(VL_1^{a})$ | $Id(E/S)$ |
| ------ | ------ | ------ | ------ |
| $VL_N^{a}\_Id$ | $P^{in}(VL_N^{a})$ | $P^{out}(VL_N^{a})$ | $Id(E/S)$ |

The first P rows correspond to $VLS^{na}$; the remaining rows correspond to $VLS^{a}$.

Fig. 5

DISTRIBUTED METHOD OF DATA ACQUISITION IN AN AFDX NETWORK

CROSS-REFERENCE TO RELATED APPLICATION

This application claims priority to French Patent Application No. 13 53573, filed on Apr. 19, 2013, the entire content of which is incorporated by reference herein.

DESCRIPTION

Background

The present subject matter relates to the field of avionics telecommunications systems and more particularly AFDX (Avionics Full DupleX) type avionics networks.

Recent avionics telecommunications systems generally use AFDX (Avionics Full DupleX) networks. It will be recalled that the AFDX network, developed for the requirements of aeronautics, is based on a switched Ethernet network. In a switched Ethernet network, each terminal, source or destination, is individually linked to a frame switch and the switches are interlinked by physical links. Each switch has a plurality of physical ports connected to the physical ports of other switches or terminals. The AFDX network makes use of the concept of the virtual link, defined as a directed Level 2 path through the network, originating from a source terminal and serving one or more destinations. A destination terminal of a virtual link is also said to be subscribed to this link.

The AFDX network offers a guarantee of service over each virtual link. More precisely, with each virtual link is associated a minimum interval between frames as well as a maximum frame size. Subject to compliance with these constraints, a maximum frame routing time, or latency limit, is guaranteed for each virtual link.

A detailed description of the AFDX network can be found in the document "AFDX protocol tutorial" available on the site www.condoreng.com as well as in the patent application FR-A-2832011 filed in the name of the Applicant. Its main characteristics will be simply recalled below.

As has already been mentioned, the AFDX network is based on a switched Ethernet network of full duplex type. The AFDX network is above all deterministic, in the sense that the virtual links have guaranteed characteristics in terms of latency limit, physical segregation of flows and bandwidth. To do this, each virtual link employs a path reserved from end to end, fragmentizing of time into transmission intervals (Bandwidth Allocation Gap or BAG) and a Maximum Frame Size (MFS). The frames are sent at the beginning of each transmission interval with a predetermined jitter tolerance. The data are transmitted in the form of IP packets wrapped in Ethernet frames. Unlike conventional Ethernet switching (using the Ethernet address of the destination), frame switching in an AFDX network uses a virtual link ID included in the frame header. When a switch receives a frame on one of its input ports, it reads the virtual link ID and determines from its switching table the output port(s) on which it must be transmitted.

Each virtual link is mono-directional. It can only be output from one source terminal at a time but can arrive at several destinations. A distinction is made between virtual links in point-to-point (or unicast) mode, serving a single destination only, and virtual links in multipoint (or multicast) mode which serve several destinations.

Thus, generally, a virtual link can be characterized by:
a single ID $VL_{Id}$;
a single source (or emitter) terminal;
a destination terminal or several destination terminals (receivers);
a bandwidth allocation gap (BAG) and a maximum frame size (MFS) on this link;
a routing in the network, i.e. a list of traversed switches.

The routing of a virtual link through a switch translates into an entry stored in the switching table of this switch, this entry comprising the virtual link ID, $VL_{Id}$, as well as the numbers of the input and output ports taken by the link.

FIG. 1 schematically represents an example of an AFDX network comprising terminals $T_1$ to $T_6$ and frame switches $SW_1$, $SW_2$. It can for example be seen that the virtual link $VL_3$ linking the terminal $T_3$ to $T_2$ is of point-to-point type whereas the virtual links $VL_2$ serving $T_2$ and $T_3$, and $VL_1$ serving $T_3$ to $T_5$ are of multipoint type.

FIG. 2 schematically represents the internal architecture of a so-called second generation AFDX switch.

The AFDX switch 100 comprises a switching module in the strict sense of the term, 110. This switching module reads the headers of the AFDX frames arriving on the various ports and extracts therefrom the IDs of corresponding virtual links.

For each incoming frame, the switching module 110 extracts the virtual link ID $VL_{Id}$ from the frame header, consults the switching table 120, verifies that the input port does indeed correspond to the virtual link and obtains the number of the output port (or the numbers of the output ports for a multicast virtual link). The switching module 110 then switches the frame to the output port thus obtained.

In practice, the input and output ports are linked to buffers and the switching is done by reading a frame of an input buffer and writing it into an output buffer.

The switching module gives the monitoring module 130 an account of the operations it carries out and, where applicable, the errors that have arisen. For example, the monitoring module updates the registers indicating the number of frames switched on each virtual link. It also registers the errors arising on the frames leading to their rejection by the switching module, for example frames exhibiting an erroneous CRC or transmitted in error (virtual link ID missing from the table), frames that have arrived on an incorrect input port (input port not corresponding to the virtual link ID), exceeding of the bandwidth (BAG) or of the set maximum frame size (MFS) on the virtual link, etc. Generally, the monitoring module keeps track in the local memory of the history of the events occurring in the switching module.

Finally, the switch 100 comprises a network interface 150, linked by an internal bus to the switching module 100, to the configuration table 120, and to the monitoring module 130. This network interface is, according to the terminology used in the Arinc 664 standard, the switch's own end system, in the same way as the end system of any terminal subscribed to the network. Thus, the AFDX switch has its own MAC address. It can therefore act as source or destination of a virtual link and in particular receive frames that are intended for it.

For example, when the switching table has to be updated, the routing information describing the new virtual links (IDs, input port No, output port No) are routed by frames on a virtual link arriving at the network interface 150 of the switch. The switching module identifies, thanks to the virtual link ID in question, that these frames are intended for the switch itself and not intended to be switched. It can then update the switching table 120 with this information.

Apart from its network interface, the control module can host test applications of the switch, for example an SNMP (Simple Network Management Protocol) agent. These applications can dialogue with remote applications, particularly those in charge of the network management function (NMF) via the network interface, each application furthermore having its own logic port (UDP port for example).

Moreover, avionics data, and especially aeroplane parameters (notably those relating to the trajectory, attitude, and speed of the aeroplane) and engine parameters (rotation speed, temperature etc.) transiting on the virtual links must be able to be controlled and stored in real time for safety and maintenance reasons. Generally, any data transmitted or received by an appliance participating in or assisting in the piloting of an aircraft will be called avionics data.

On aircrafts of recent design, the acquisition of avionics data is performed by a centralized data acquisition unit (CDAU) or else by a software package hosted in a centralized data acquisition module (CDAM).

This centralized acquisition unit allows, among other things, access to the stored values of the aeroplane and engine parameters, to generate status reports for purposes of maintenance or optimization of aircraft operability.

FIG. 3 represents an AFDX network to which a centralized data acquisition unit is linked.

More precisely, this centralized acquisition unit CDAU/CDAM is linked by physical links to the switches of the AFDX network, hereinafter named acquisition switches, to which subscriber terminals are directly connected (switches $SW_1, SW_2, SW_3$ in the figure.)

The centralized acquisition unit CDAU/CDAM can require that avionics data be transmitted to it by one of the acquisition switches, in other words that frames from certain virtual links be retransmitted to it.

In this case, the frame containing avionics data is not only switched by the acquisition switch, in the same way as a conventional AFDX switch, but also copied and transmitted to the centralized acquisition unit. The frame can be transmitted, either as it is, i.e. in the form of an AFDX frame on a virtual link linking the switch to the centralized acquisition unit (the destination Ethernet address then comprises a constant of 24 bits and the virtual link ID on 16 bits), or in the form of a single Ethernet frame (in which case the Ethernet address is simply that of the centralized acquisition unit). In the first case, this equates to duplicating the virtual link passing through the switch by a virtual link having for destination the centralized acquisition unit or, in an equivalent manner, to adding to this virtual link a branch having this unit for destination.

In the example represented, the acquisition switches $SW_1$, $SW_2, SW_3$ are linked to the centralized data acquisition unit CDAU/CDAM by physical links and the avionics data frames are transmitted to it via virtual links. More precisely, the virtual link $VL_1$ starting from the terminal $T_1$ and passing through switches $SW_1, SW_4, SW_6$ is duplicated by the switch $SW_1$ into a virtual link $VL_1^d$, the virtual link $VL_2$ starting from the terminal $T_2$ and passing through switches $SW_2$, $SW_3, SW_5$ is duplicated by the switch $SW_2$ into a virtual link $VL_2^d$ and the virtual link $VL_3$ starting from the terminal $T_3$ and passing through the switches $SW_3, SW_6$ is duplicated by the switch $SW_3$ into a virtual link $VL_3^d$. It will be noted that the virtual links $VL_1^d$, $VL_2^d$ and $VL_3^d$ arrive at different network interfaces (E/S) from the acquisition unit CDAU/CDAM.

The centralized acquisition unit is provided with as many network interfaces as there are AFDX switches to which it is linked. Indeed, for reasons of bandwidth limitation it would not be conceivable to connect this unit to a single network switch (and therefore to provide only a single network interface on the acquisition unit), because the traffic on the duplicated virtual links would then jam up the network.

Next, the centralized acquisition unit being an appliance common to the whole network, it is understood that it must comply with particularly stringent protection constraints so as to avoid a failure of the unit affecting the correct operation of the set of AFDX network switches.

Furthermore, any change in network configuration (addition or removal of an acquisition switch for example) requires the hardware architecture of the centralized acquisition unit to be modified and recertified.

Finally, the implementation of the centralized acquisition method requires a port of each acquisition switch to be dedicated to a link with the acquisition unit, which limits the possibilities of interconnection of the network.

It will consequently be understood that the current implementation of the acquisition of data transiting on the network is complicated and expensive.

An aim of the present subject matter is to propose a data acquisition method that is simpler and more flexible than that used in the prior art.

SUMMARY

The present subject matter is defined by a frame switch of an AFDX network comprising:
  a plurality of input ports and a plurality of output ports;
  a switching table comprising a plurality of entries, each entry corresponding to a virtual link passing through the switch and providing, for a virtual link ID, the input port and the output port(s) taken by this virtual link;
  a switching module suitable for switching any frame arriving on an input port of the switch, for reading a virtual link ID contained in a header of the frame and for switching the latter towards the output port(s) given by the entry in the switching table corresponding to this virtual link;
  a network interface suitable for receiving frames intended for the switch.
This frame switch is particular in that:
  at least one entry of the switching table, corresponding to a predetermined virtual link, furthermore comprises an ID of the MAC address of the switch;
    the switching module transmits any frame received on the predetermined virtual link to the network interface of the switch;
    the frame received on the predetermined virtual link is transmitted to an application (DDA) hosted by the switch to locally store at least part of the data of this frame.

Such a switch makes it possible to carry out data acquisition in a way that is distributed over the network, and to handle the acquisition flexibly, at application level, without having to reconfigure the interfaces of a centralized acquisition unit for each network modification and without having to monopolize ports of AFDX switches for this function.

Advantageously, said data acquisition application locally stores at least part of the frame data with an ID of the predetermined virtual link to which the frame belongs.

Alternatively, said data acquisition application recovers, from an ID of the predetermined virtual link, from an IP address, from a UDP port and from a segment ID in a UDP packet, said part of the frame data, and stores said part of the frame data locally, with said ID of the predetermined virtual link, said IP address, said UDP port and said segment ID.

In all cases, said data acquisition application can compress said part of the frame data before storing it locally.

Preferably, the data acquisition application is adapted to receive a data acquisition request from a remote server, the request giving at least one virtual link for which data are to be acquired, said application updating the switching table by adding for this virtual link, the ID of the MAC address of the switch.

Said data acquisition request can furthermore comprise an IP address, a UDP port and a segment ID in a UDP packet.

The data acquisition application can also be adapted to receive a data transfer request from a remote server, the request comprising at least one virtual link ID whose data are to be transferred, said application transferring said data in Ethernet frames via a gateway hosted by the switch.

Alternatively, the data acquisition application can be adapted to receive a data transfer request from a remote server, the request comprising at least one virtual link ID whose data are to be transferred, said application transferring said data in AFDX frames via a virtual link linking the frame switch to said remote server.

The subject matter disclosed herein also relates to an AFDX network comprising at least one frame switch as defined previously.

The AFDX network can furthermore comprise a server subscribed to said network, the server being adapted to transmit at least one data acquisition request to each switch of said plurality, a data acquisition request being parameterized by at least one ID of a virtual link passing through said switch.

The data acquisition request can furthermore be parameterized by an IP address, a UDP port and a segment in a UDP packet.

The server subscribed to said network can furthermore be adapted to transmit data transfer requests to each switch of said plurality, a data transfer request being parameterized by at least one virtual link ID whose data are to be transferred.

Said data transfer request can also be parameterized by an IP address, a UDP port and a segment ID in a UDP packet.

Finally, the present subject matter disclosed herein also relates to an aircraft comprising an AFDX network as defined previously.

BRIEF DESCRIPTION OF THE DRAWINGS

Other features and advantages of the subject matter disclosed herein will become apparent upon reading preferred embodiments of the subject matter disclosed herein, offered with reference to the appended figures among which:

FIG. 5 represents an example of a switching table used by an AFDX switch according to an embodiment of the subject matter disclosed herein.

DETAILED DESCRIPTION

A basic idea of the subject matter disclosed herein is to implement decentralized (or distributed) data acquisition at the level of each switch of the AFDX network and more precisely to host a data acquisition application inside each switch.

Figure 1:
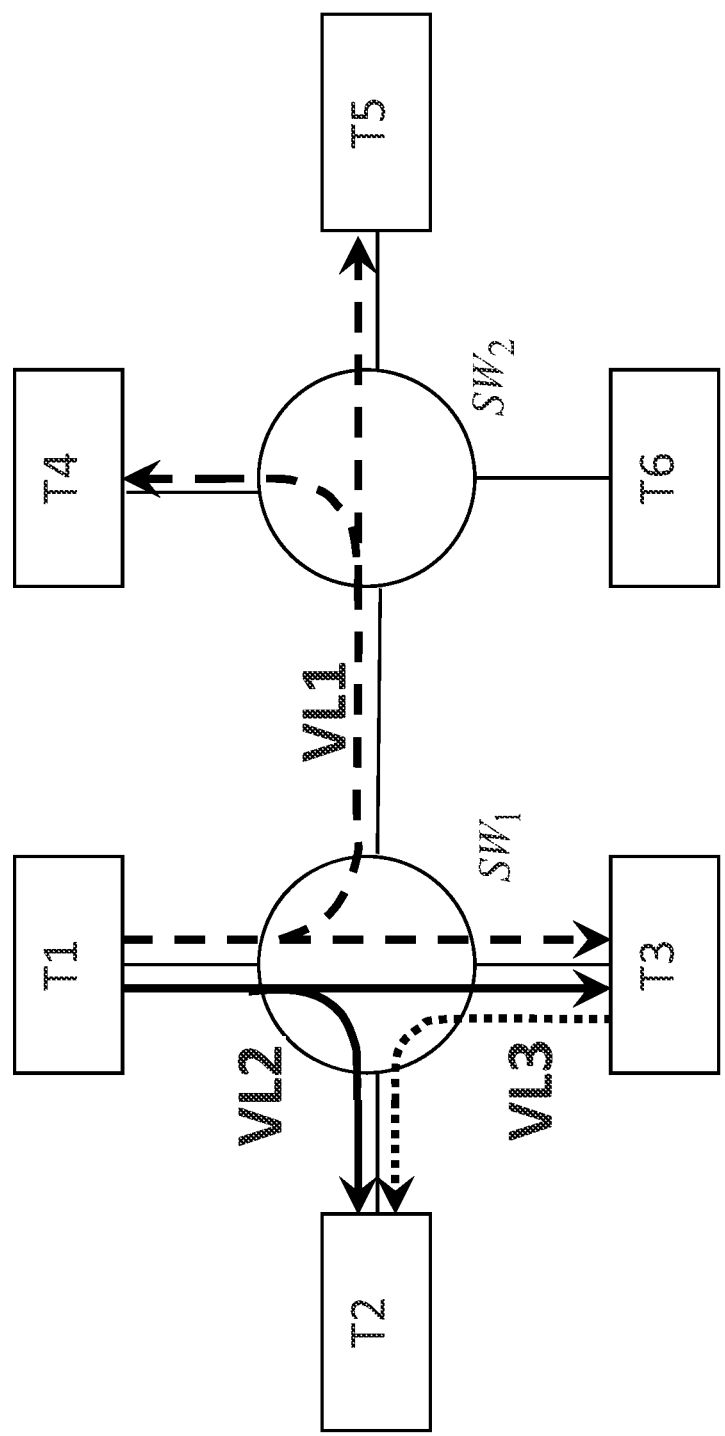
FIG. 1 represents an example of a known AFDX network of the state of the art.
Figure 2:
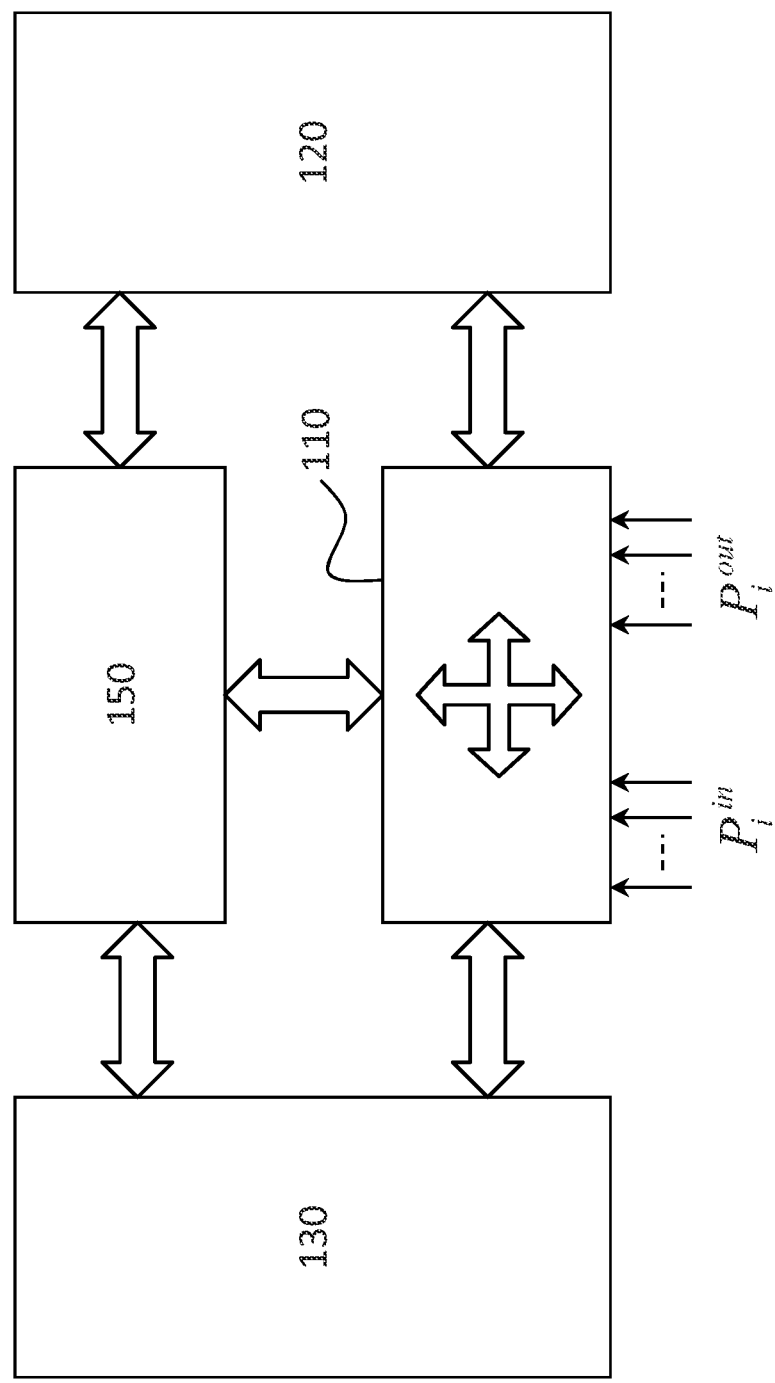
FIG. 2 schematically represents the internal architecture of an AFDX switch.
Figure 3:
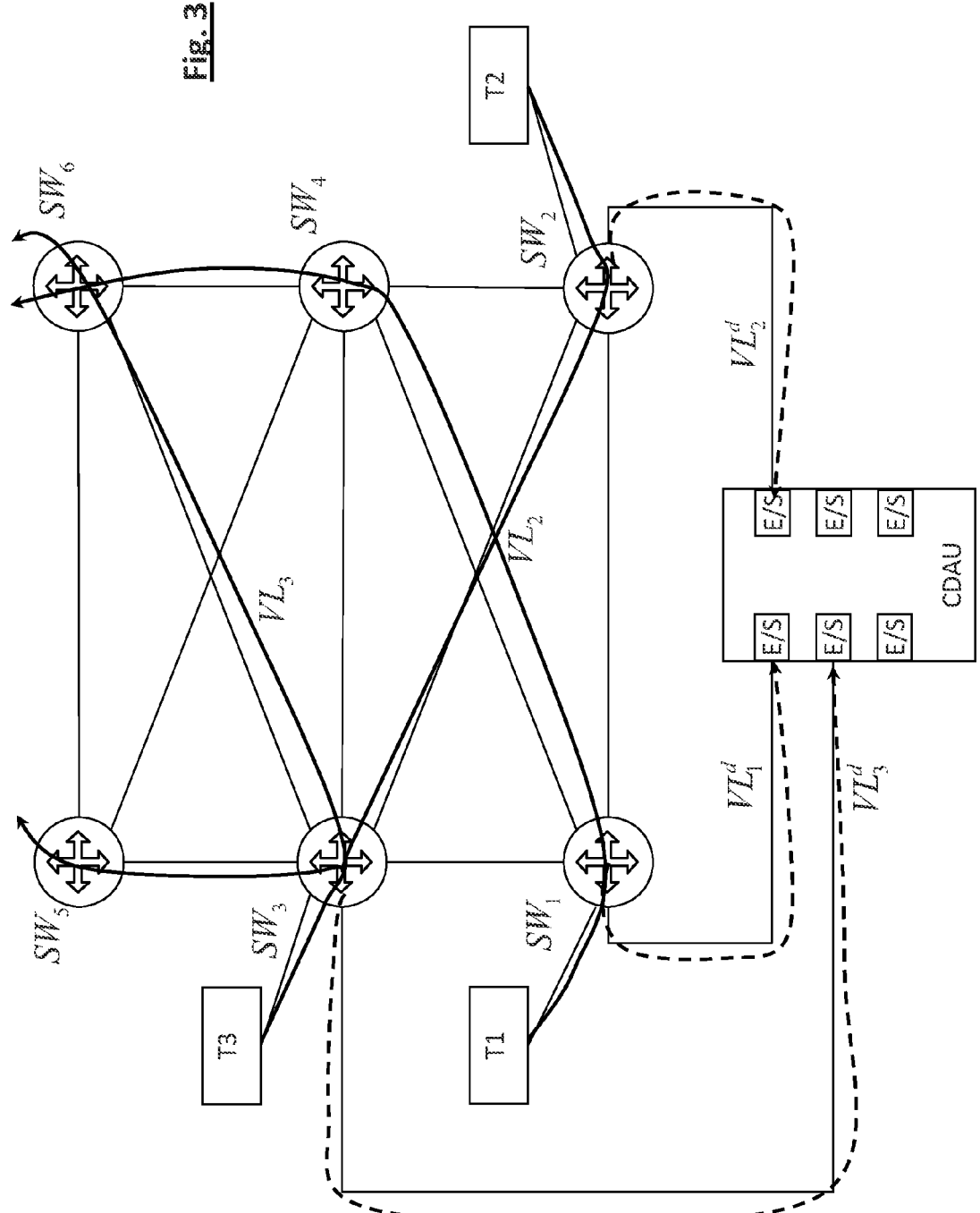
FIG. 3 schematically represents an AFDX network to which a centralized data acquisition unit is subscribed.

Consider again an AFDX network including a plurality of switches, each switch having the internal architecture described with reference to FIG. 2. A plurality of terminals is subscribed to this network and exchanges AFDX frames by virtual links, in a manner known per se.

Figure 4:
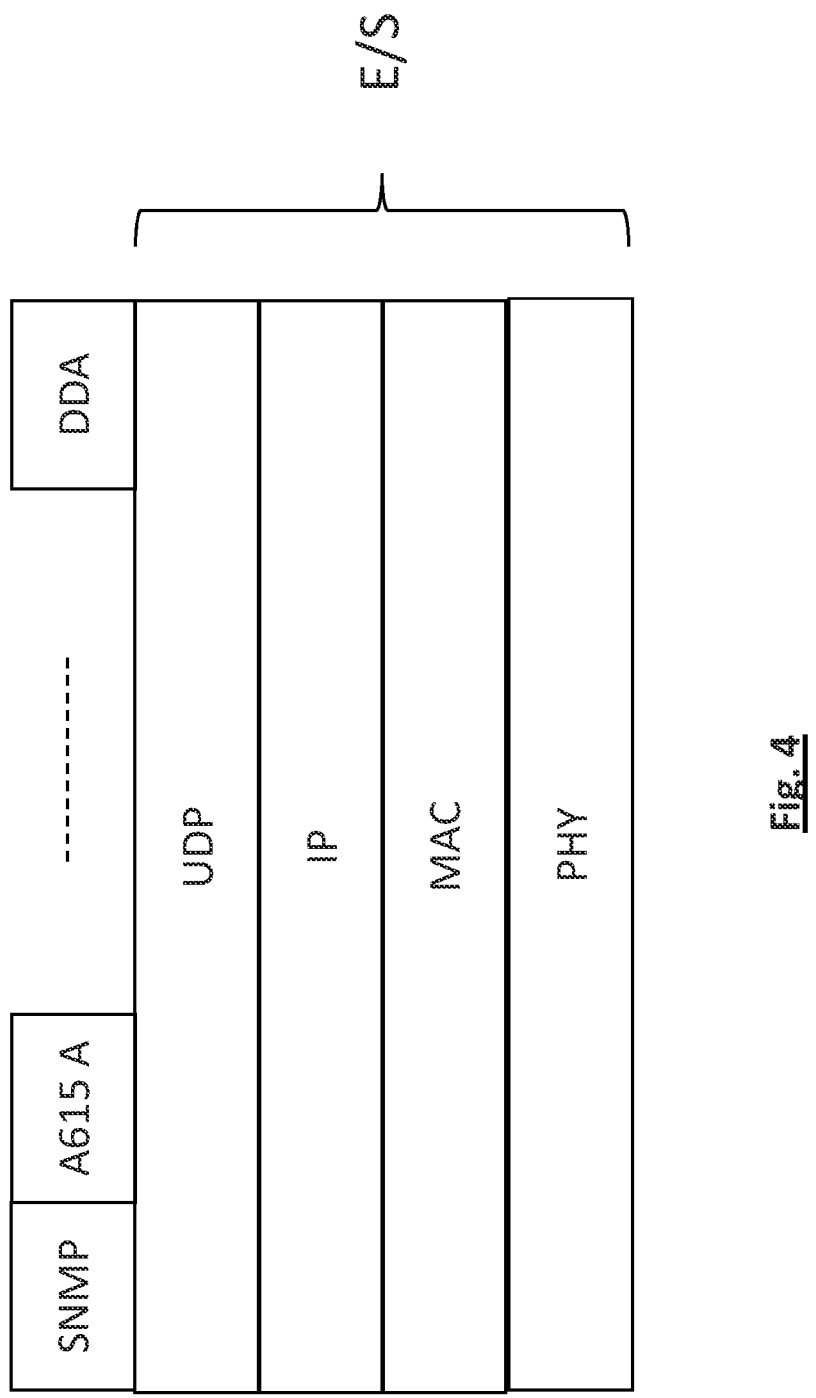
FIG. 4 represents the implementation of the data acquisition application inside the control module of an AFDX switch according to an embodiment of the subject matter disclosed herein.

Using a protocol stack, FIG. 4 represents the manner in which the data acquisition application is implemented inside the network interface (End System E/S) of the switch.

The lowest protocol layer corresponds to the physical layer PHY of the network interface. It is overlaid by the AFDX link layer. When receiving, the latter is adapted to receive the AFDX frames via the internal bus of the switch. When sending, it regulates the transmission of the AFDX frames on the network so as to comply with the bandwidth constraints for the various virtual links. The third layer corresponds to the IP (Internet Protocol) layer of the network interface. When receiving, it is responsible for the CRC (Cyclic Redundancy Check) verification of the IP datagrams (IP checksum) and, where applicable, for defragmentizing to reconstitute the UDP (User Datagram Protocol) packets. When sending, it is in charge of the fragmentizing of the UDP packets into IP datagrams, of the computation and concatenation of the CRC to the datagrams, then of the concatenation of the Ethernet frame header (comprising the virtual link ID.)

The fourth layer corresponds to the UDP layer of the network interface. This layer provides communications logic ports to the applications hosted by the switch.

Above the transport layer (UDP layer) examples of applications being able to be hosted by the switch are represented. The logic ports provided by the underlying UDP layer allow these applications to communicate with remote applications via the AFDX network.

Thus, an SNMP (Simple Network Management Protocol) agent can dialogue with the network supervisor and provide data relating to the management of the switch. An Arinc 615A module enables new data to be downloaded into the switch, for example a new switching table, via the AFDX network.

Finally, according to an embodiment of the subject matter disclosed herein, an application denoted DDA (for Distributed Data Application) is in charge of acquiring the data it receives on certain virtual links. This application can notably dialogue with a remote server in charge of the centralization of the data thus acquired, of their mass storage and, where applicable, of the presentation of these data by a HMI interface. The DDA application can also receive requests from this server to acquire, or on the contrary, to cease to acquire data over a given virtual link. It thus manages a list of virtual links $VLS^a = \{VL_1^a, \ldots VL_N^a\}$ passing through the switch and whose data it has to acquire.

FIG. 5 represents an example of a switching table used by an AFDX switch according to an embodiment of the subject matter disclosed herein.

This table contains the list of virtual links that the AFDX switch has to switch. This list is composed of two sub-lists: a first sub-list $VLS^a$ of virtual links whose data are to be acquired and a second sub-list $VLS^{na}$ of virtual links whose data are not to be acquired. For example, the first list can be composed of virtual links transporting avionics data in the sense defined above.

It can be seen that to each virtual link $VL_1^{na}, \ldots VL_P^{na}$ of the sub-list $VLS^{na}$ there corresponds an entry in the switching table. At this entry are stored the input port and the output port(s) of the switch that are taken by the virtual link. It will be understood that when several output ports are stored in an entry of the table, the virtual link is of multicast (or multipoint) type.

Similarly, to each virtual link $VL_1^a, \ldots VL_N^a$ of the sub-list $VLS^a$ there corresponds an entry in the switching table at which are stored the input port and the output port(s) of the switch that are taken by the virtual link. However, unlike the previous case, each entry furthermore comprises, following the output port (s), an $ID_{Id(E/S)}$ representing the internal bus or, equivalently, the MAC address of the switch.

Thus, a frame received on a virtual link $VL_n^a$ of $VLS^a$ is not only switched towards the output port(s) featuring in the table, but also transmitted via the internal bus to the network interface (E/S) of the switch.

Just like the network interface of any subscriber, the network interface of the switch rejects frames belonging to virtual links of which it is not the destination. To do this, it has a filtering table comprising the IDs of the virtual links of which it is effectively the destination. This table notably contains the IDs of the virtual links whose data is to be acquired, namely, $VL_1^a\_Id, \ldots, VL_N^a\_Id$, as will be explained further on.

Furthermore, the switching module rejects any frame whose virtual link is not listed in the switching table or whose input port is not the one indicated in the table for the virtual link in question. In this way it is ensured that only the virtual links passing through the correct input port of the switch and belonging to the sub-list $VLS^a$ are duplicated towards the network interface of the switch.

When the network interface receives a frame whose virtual link has for destination the switch itself (such a virtual link is for example used for updating the switching table), the latter transmits it, through the protocol stack, to the IP address and to the UDP port of the application that are specified in the frame. When the IP address and/or the UDP port specified in the frame are not recognized by the network interface, the latter supposes that it is a frame to be acquired and transmits it to the UDP port of the DDA application in charge of the acquisition of the frame and of its possible processing.

In a variant, the network interface operates in promiscuous mode, i.e. does not carry out any filtering of frames based on the virtual link IDs, the switching module continuing, however, to ensure the rejection of any frame whose virtual link is not listed in the switching table, as explained previously. In this case, filtering is only ensured by the switching module. The frames received by the network interface are transmitted to the IP address and to the UDP port that are specified in the frame, as previously indicated. Here again, if the IP address and/or the UDP port are not recognized, the frame is transmitted to the DDA application.

On request from the remote server in charge of the centralization of the acquired data, the DDA application recovers and stores at least part of the data contained in the frames belonging to a virtual link $VL_n^a$ and stores them locally in a buffer for later retransmission.

In a variant, the acquired data are stored locally in a memory. In this case, the acquired data are advantageously compressed using a data compression algorithm, known per se, before they are stored. The storage can furthermore be subordinated to the arising of a particular event or to the request from the remote server in charge of the centralization of the acquired data.

The DDA application can receive from the remote server a request giving a list of the virtual link IDs whose data are to be acquired, and updates the switching table by adding the ID of the MAC address of the switch for each of the virtual links of the list. Furthermore, the IDs of the virtual links in question are also added to the filtering table of the network interface of the switch.

Alternatively, the remote server can send a specific request for the acquisition of each virtual link, ordering an acquisition or on the contrary the cessation of this acquisition on this link. It is understood that the updating of the switching table and of the filtering table is then carried out on a case per case basis.

An acquisition request can indicate for any virtual link, the IP address, the UDP port, or even the segment of the "data" field of the packet, corresponding to the data to be acquired. The segment can be identified by its start address and its length. It is thus understood that the DDA application can thus selectively extract the interesting data using a filtering operation controlled by the remote server. The quantity of data to be stored locally and to be retransmitted to the remote server is reduced by that amount.

The format of an acquisition request transmitted to the switch can take the following form:

acquisition_request(*VL_Id*,[*IP*_address],[*UDP*_port], [start_bit,length])

where the parameters between square brackets are optional. The acquired data are stored with the virtual link ID and, where applicable, the IP address, the UDP port and the segment ID in the UDP packet.

The stored data can be transmitted, either in AFDX frames, via a virtual link linking the switch to the server, or in single Ethernet frames (therefore without reservation of bandwidth) via a gateway hosted by the switch. In the first case, the bandwidth allocation gap (BAG) on the virtual link will be chosen small enough so as not to have to restrict the bandwidths allocated to the other virtual links. In the second case, the Ethernet frames are transmitted in the non-allocated bandwidth, according to a strategy of Best Effort type.

The transmission to the server of the acquired data can be done on a continuous flow basis, when transmission resources are available (resources guaranteed in the case of a virtual link.) This operation mode requires only the storage of data in a buffer.

Alternatively, the acquired data are stored (after possibly being compressed) in a memory of the switch and are only transmitted to the server in the event of a transmission request from the latter.

In this case, the transmission request of the server contains the virtual link ID (and where applicable, the IP address, the UDP port and the segment ID) for which the stored data are to be transferred.

As a general rule, a transmission on a continuous flow basis will nonetheless be preferred in order not to compromise the memory resources of the switch.

As in the prior art described in the introduction, to acquire data over a virtual link, the server will simply be able to request an acquisition from the first switch, or more generally request it from any switch traversed by this link. However, in the present case, given that it is not necessary to reserve physical ports dedicated to acquisition and to provide direct physical links with the server, it may in certain cases be possible to carry out an acquisition of data into several switches over this link, notably for test reasons.

It is understood that, according to the subject matter disclosed herein, the function of data acquisition is decentralized into the various switches. The removal or the addition of a switch does not require any hardware reconfiguration but simply the updating of the switching tables in the switch in question and, where applicable, the software package of the remote server.

The invention claimed is:

1. A frame switch of an Avionics Full-Duplex Switched Ethernet (AFDX) network comprising a plurality of input ports and a plurality of output ports, a switching table comprising a plurality of entries, each entry corresponding to a virtual link passing through the switch and providing, for a virtual link ID ($VL_{Id}$) for the virtual link, the input port and the output port(s) taken by this virtual link, a switching module circuit configured for switching any frame arriving on an input port of the frame switch, for reading the virtual link ID contained in a header of the frame and for switching the frame towards the output port(s) given by the entry in the switching table corresponding to this virtual link, a network interface configured for receiving frames intended for the frame switch, wherein:

at least one entry of the switching table, corresponding to a predetermined virtual link, furthermore comprises an ID of a media access control (MAC) address of the frame switch;

the switching module circuit is configured to transmit at least one frame received on the predetermined virtual link to the network interface of the frame switch; and the frame switch transmits the at least one frame received on the predetermined virtual link to a distributed data application (DDA) hosted by the frame switch to locally store at least part of the frame data of the at least one frame, and wherein transmitting the at least one frame comprises, in response to determining that the at least one frame corresponds to the predetermined virtual link with the ID of the MAC address of the frame switch, transmitting the at least one frame through an Internet Protocol (IP) layer and through a transport layer of a protocol stack of the frame switch to the distributed data application, wherein the distributed data application receives a data acquisition request from a remote server, the data acquisition request giving at least one virtual link for which data are to be acquired, the distributed data application updating the switching table by adding for this virtual link, the ID of the MAC address of the frame switch.

2. A frame switch according to claim 1, wherein the distributed data application locally stores at least part of the frame data with an ID of the predetermined virtual link to which the at least one frame belongs.

3. The frame switch according to claim 1, configured such that the distributed data application recovers, from an ID of the predetermined virtual link, from an IP address, from a user datagram protocol (UDP) port and from a segment ID in a UDP packet, said part of the frame data, and stores said part of the frame data locally, with said ID of the predetermined virtual link, said IP address, said UDP port and said segment ID.

4. The frame switch according to claim 2, wherein the distributed data application compresses the part of the frame data before storing it locally.

5. The frame switch according to claim 1, wherein the data acquisition request furthermore comprises an IP address, a user datagram protocol (UDP) port and a segment ID in a UDP packet.

6. The frame switch according to claim 1, wherein the distributed data application receives a data transfer request from the remote server, the data transfer request comprising at least one virtual link ID whose data are to be transferred, the distributed data application transferring said data in Ethernet frames via a gateway hosted by the frame switch.

7. The frame switch according to claim 1, wherein the distributed data application is configured to receive a data transfer request from the remote server, the data transfer request comprising at least one virtual link ID whose data are to be transferred, said application transferring said data in AFDX frames via a virtual link linking the frame switch to said remote server.

8. An AFDX network comprising a plurality of frame switches according to claim 1.

9. An AFDX network according to claim 8, comprising a server subscribed to said network, the server being configured to transmit at least one data acquisition request to each frame switch of said plurality of frame switches, the at least one data acquisition request being parameterized by at least one ID of a virtual link passing through the frame switch.

10. An AFDX network according to claim 9, wherein the data acquisition request is furthermore parameterized by an IP address, a user datagram protocol (UDP) port and a segment ID in a UDP packet.

11. An AFDX network according to claim 8, furthermore comprising a server subscribed to said network, the server being configured to transmit data transfer requests to each frame switch of said plurality, a data transfer request being parameterized by at least one virtual link ID whose data are to be transferred.

12. An AFDX network according to claim 11, wherein the data transfer request is furthermore parameterized by an IP address, a user datagram protocol (UDP) port and a segment ID in a UDP packet.

13. An aircraft comprising an AFDX network according to claim 8.

* * * * *